(12) United States Patent
Thompson

(10) Patent No.: US 6,532,915 B2
(45) Date of Patent: Mar. 18, 2003

(54) SEALING ARRANGMENT FOR A CYLINDER LINER

(75) Inventor: Lloyd E. Thompson, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/917,092

(22) Filed: Jul. 27, 2001

(65) Prior Publication Data

US 2003/0019443 A1 Jan. 30, 2003

(51) Int. Cl.[7] .................................................. F02F 1/10
(52) U.S. Cl. .................................................. 123/41.74
(58) Field of Search ........................... 123/193.2, 193.3, 123/41.74, 41.84, 668, 669; 29/888.061

(56) References Cited

U.S. PATENT DOCUMENTS

| | | | |
|---|---|---|---|
| 3,403,661 A | * 10/1968 | Valentine et al. | 123/41.84 |
| 3,853,099 A | * 12/1974 | Feather et al. | 123/41.84 |
| 4,244,330 A | 1/1981 | Baugh et al. | |
| 4,273,835 A | * 6/1981 | Higuchi | 123/41.84 |
| 4,385,595 A | 5/1983 | Shaw | |
| 4,417,549 A | 11/1983 | Kazenmaier et al. | |
| 4,440,118 A | 4/1984 | Stang et al. | |
| 4,505,234 A | 3/1985 | Meiners | |
| 4,656,982 A | * 4/1987 | Mirjanic | 123/193.3 |
| 4,770,133 A | 9/1988 | Schibalsky | |
| 5,402,754 A | 4/1995 | Gunnarsson | |
| 5,596,954 A | 1/1997 | Kennedy | |

* cited by examiner

Primary Examiner—Gene Mancene
Assistant Examiner—Hyder Ali
(74) Attorney, Agent, or Firm—Jeff A Greene

(57) ABSTRACT

An improved sealing arrangement 40 is provided for a replaceable cylinder liner 10. The sealing arrangement 40 includes a seal 26 in the form of a band that is positioned in an annular groove 28 under a flange seat 20 of the cylinder liner 10. The annular groove 28 includes a first and a second undercut 30,34 that provides a relief area for the seal 26 to deflect into lessening the opportunity of damage to the seal 26. The first and second undercuts 30,34 also relieve stress in the axial direction improving the fatigue life of the cylinder liner 10.

15 Claims, 1 Drawing Sheet

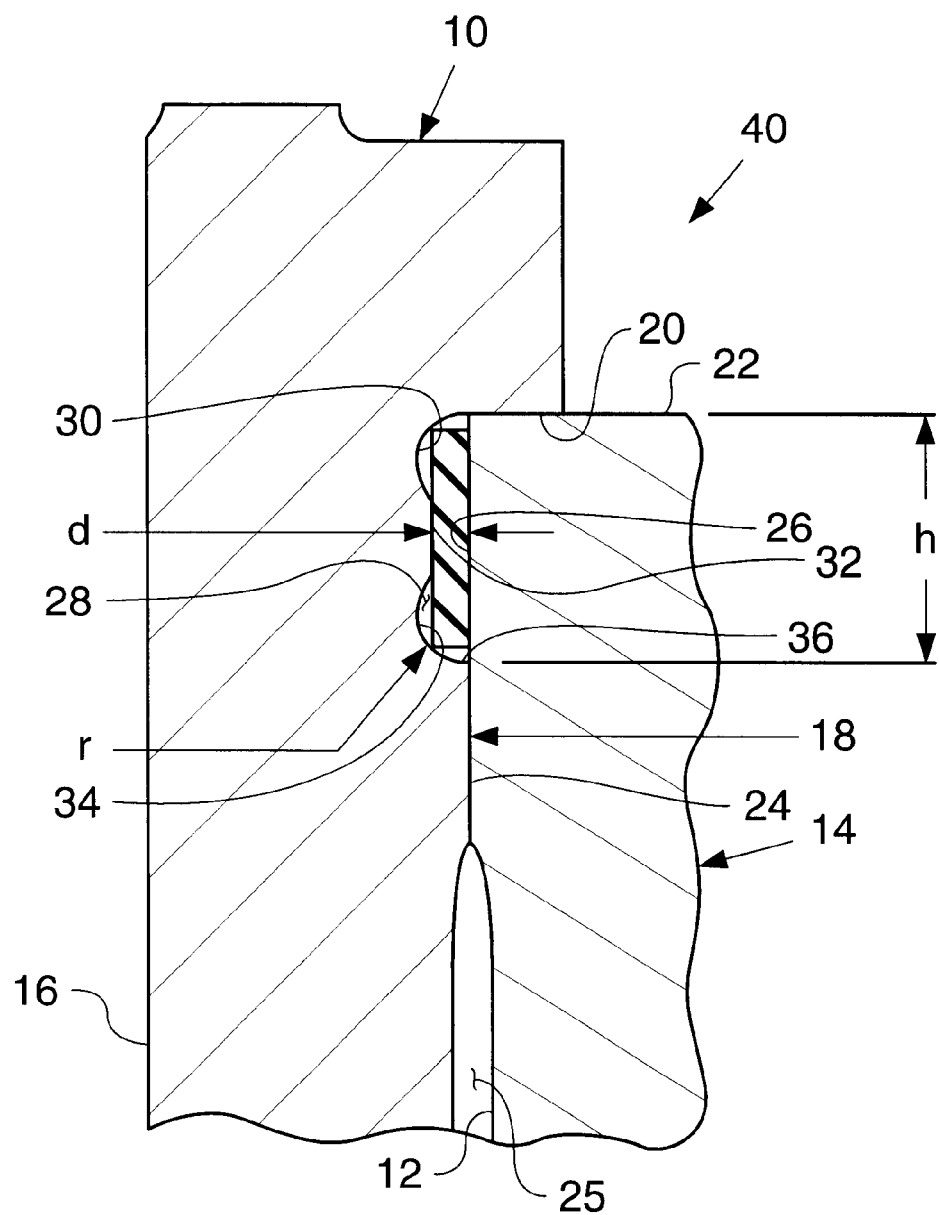

SEALING ARRANGMENT FOR A CYLINDER LINER

TECHNICAL FIELD

The present invention relates internal combustion engines and more particularly to an improved sealing arrangement for a replaceable wet cylinder liner.

BACKGROUND

Over the decades internal combustion engines have evolved with basically two different types of block configurations. The integral bore cylinder block and replaceable cylinder liner types of which there are two configurations top flanged liner with spacer plate and block combination and the mid supported liner spacer deck block arrangement.

The incorporation of the replaceable liners in the design of an engine provides numerous advantages to the manufacturer and the end user in addition to the obvious benefit of allowing such liners to be replaced during overhaul of the engine. These liners are usually wet liners and are provided with a sealing arrangement at the top and bottom of the outside diameter of the liner. The sealing arrangement at the top and bottom create an open volume or passage defined around the liner exterior and the block for flow of coolant.

Such sealing arrangements for the top part of the wet cylinder liners adjacent to the head have long been part of the art. In this arrangement, the top guiding portion of the liner follows directly below a sealing arrangement in order to provide good guidance and to provide good contact with the block. One such arrangement is disclosed in U.S. Pat. No. 4,417,549 and issued on Nov. 29, 1983 to Ulrich Kazenmaier and assigned to M.A.N. Maschinenfabrik. Maschinenfabrik. This design uses two spaced apart o-rings directly below the flange seat to perform the sealing. Since o-rings are used two grooves or recesses, cut into the exterior of the cylinder liner above the guide portion, are required at a depth sufficient to retain the position of the o-rings from axial movement and hold them to a diameter to provide the sealing. This creates two separate points for fatigue at the top portion of the liner in a highly stressed area under the flange seat.

The present invention is directed to overcome one or more of the problems as set forth above.

SUMMARY OF INVENTION

In one aspect of the present invention a sealing arrangement is provided for a replaceable cylinder liner of an internal combustion engine. The sealing arrangement includes an annular groove positioned in an outer surface of the cylinder liner adjacent a flange seat and extending in an axial direction towards a guide portion. The annular groove has a first undercut positioned at the intersection of the flange seat and a vertical wall portion of the annular groove and a second undercut positioned at the intersection of the vertical wall portion and a horizontal leg portion of the annular groove.

BRIEF DESCRIPTION OF THE DRAWINGS

The sole FIGURE is a fragmentary cross-section view of the interface between a wet cylinder liner and an engine block embodying the present invention.

DETAILED DESCRIPTION

The FIGURE illustrates a fragmentary cross-section of a portion of a cylinder liner 10, which is inserted in a bore 12 of an engine block 14. The cylinder liner 10 defines an inner surface 16, where a piston (not shown) linearly reciprocates, and an exterior diameter 18. Cylinder liner 10 also includes a flange seat 20 that rests on a head deck 22 of the engine block 14, and in the radial direction, the outer surface 18 contacts the bore 12 of the engine block 14 with a guiding portion 24. Directly below the guiding portion 24 is a recess passage 25 formed by an annular space created by a reduction in the outer surface 18 of the cylinder liner 10 and the bore 12 of the block 14.

A seal 26 is positioned in an annular groove 28 formed between the flange seat 20 and the guiding portion 24. The seal 26 is a flexible member that fills a majority of the annular groove 28 preventing any coolant that may leak past the guiding portion 24 from progressing upwards towards the head deck 22. Seal 26 is made of an elastomeric material and is generally in the form of a band.

Annular groove 28 is cut into the exterior of the cylinder liner 10 in the radial direction at a depth "d" less than the diameter of the guiding portion 24. Annular groove 28 is positioned under the flange seat 16 and extends downward there from an axial length "h". The depth "d" and length "h" of annular groove 28 are predetermined dimensions sufficient to contain a specified seal 26 for a given cylinder liner 10 design. Generally the axial length "h" of the annular groove 28 is in the range of three to seven times greater than the depth "d".

A first undercut 30 is formed at the upper portion of the annular groove 28 at the intersection of the flange seat 20 and a vertical wall portion 32 of the annular groove 28 that extends towards the guide portion 24. A second undercut 34 is formed at the intersection of the vertical wall portion 32 and a bottom horizontal leg 36 of the annular groove 28. The first undercut 30 and the second undercut 34 each have an equal radius "r" and extend inward a predetermined depth from the vertical wall portion 32 an equal amount.

The first and second undercuts 30,34 in the annular groove 28 and the seal 26 provide an improved sealing arrangement 40 for the replaceable cylinder liner 10 of an internal combustion engine.

Industrial Applicability

In operation, the annular groove 28 defines a recess area that contains the seal 26 that provides a dual benefit. First, the first and second undercuts 30,34 in the annular groove 28 provide relief for the ends of the seal 26 to move or deflect into as the cylinder liner 10 is being pressed into the bore 12 of the engine block 14. In this manner, sharp edges or burrs that may be present on the bore 12 of the engine block 14 do not damage the seal 26 thus reducing the sealing potential of the arrangement.

Additionally, the undercuts 30,34 in the annular groove 28 reduce the stiffness in the axial direction of the cylinder liner 10 directly below the flange seat 20. The reduction in stiffness spreads strain in the area under the flange seat 20 reduces the peak strain, which in turn reduces the mean strain level. Thereby improving fatigue life of the cylinder liner 10.

What is claimed is:

1. A sealing arrangement for a replaceable cylinder liner of an internal combustion engine, a sealing arrangement comprising:
   an annular groove positioned in an outer surface of the cylinder liner adjacent a flange seat and extending in an axial direction towards a guide portion;
   a first undercut positioned at the intersection of the flange seat and a vertical wall portion of said annular groove; and a second undercut positioned at the intersection of the vertical wall portion and a horizontal leg portion of said annular groove.

2. The sealing arrangement of claim 1 wherein the annular groove having an axial length "h" and a depth "d", said axial length "h" being in the range of three to seven times said depth "d".

3. The sealing arrangement of claim 1 wherein said first and second undercuts each have a predetermined radius "r".

4. The sealing arrangement of claim 3 wherein the predetermined radius "r" of the first and second undercuts are equal to one another.

5. The sealing arrangement of claim 3 wherein said first and second undercuts extend inward from the vertical wall portion toward the internal bore an equal predetermined distance.

6. The sealing arrangement of claim 1 including a seal that is positioned in and fills a majority of the annular groove.

7. The sealing arrangement of claim 6 wherein the first and second undercuts provide relief for the sealing band when the cylinder liner is positioned into the bore of the engine block during assembly.

8. The sealing arrangement of claim 6 wherein the sealing band having the form of a band made of an elastomeric material.

9. A replaceable cylinder liner having an outer surface, an inner surface and a flange seat for use in an engine block of an internal combustion engine, said replaceable liner comprising:

a sealing arrangement positioned adjacent to the flange seat and extending therefrom; and said sealing arrangement including an annular groove extending in an axial direction towards a guide portion, a first undercut positioned at the intersection of the flange seat and a vertical wall portion of said annular groove, a second undercut positioned at the intersection of the vertical wall portion and a horizontal leg portion of said annular groove.

10. The replaceable cylinder liner of claim 9 wherein said annular groove having an axial length "h" and a depth "d" and said axial length "h" is in the range of three to seven times said depth "d".

11. The replaceable cylinder liner of claim 9 wherein said first and second undercuts each have a predetermined radius "r" being equal to one another.

12. The replaceable cylinder liner of claim 11 wherein said first and second undercuts extend inward from the vertical wall portion n equal predetermined distance.

13. The replaceable cylinder liner of claim 9 including a seal positioned in and filling a majority of said annular groove.

14. The replaceable cylinder liner of claim 13 wherein said first and second undercuts provide relief for said seal when said cylinder liner 10 is positioned into the bore of the engine block during assembly.

15. The replaceable cylinder liner of claim 13 wherein said seal having the form of a band made of an elastomeric material.

* * * * *